US009582968B2

(12) United States Patent
Rosenheimer et al.

(10) Patent No.: US 9,582,968 B2
(45) Date of Patent: Feb. 28, 2017

(54) 3D LOTTERY CARD

(71) Applicant: PayMaxs Ltd., Petach-Tikva (IL)

(72) Inventors: Amir Rosenheimer, Petach-Tikva (IL); Shahar Koren Pinto, Beverly Hills, CA (US)

(73) Assignee: PayMaxs Ltd., Petach-Tikva (IL)

( * ) Notice: Subject to any disclaimer, the term of this patent is extended or adjusted under 35 U.S.C. 154(b) by 0 days.

(21) Appl. No.: 14/945,539

(22) Filed: Nov. 19, 2015

(65) Prior Publication Data

US 2016/0196719 A1 Jul. 7, 2016

Related U.S. Application Data

(63) Continuation of application No. 14/588,953, filed on Jan. 4, 2015, now abandoned.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ......... *G07F 17/329* (2013.01); *G07F 17/3211* (2013.01); *G07F 17/3223* (2013.01); *G07F 17/3225* (2013.01); *G07F 17/3241* (2013.01)

(58) Field of Classification Search

CPC ............................................... A63F 2300/8082

See application file for complete search history.

(56) References Cited

U.S. PATENT DOCUMENTS

| | | |
|---|---|---|
| 5,871,398 A | 2/1999 | Schneier et al. |
| 6,086,477 A | 7/2000 | Walker et al. |
| 6,277,026 B1 | 8/2001 | Archer |

(Continued)

FOREIGN PATENT DOCUMENTS

| | | | |
|---|---|---|---|
| WO | WO 2014043226 A1 * | 3/2014 | ............ G07F 17/32 |
| WO | WO 2016/108243 | 7/2016 | |

OTHER PUBLICATIONS

International Search Report and the Written Opinion Dated Apr. 18, 2016 From the International Searching Authority Re. Application No. PCT/IL2016/050001.

(Continued)

*Primary Examiner* — Kevin Y Kim

(57) ABSTRACT

A method of activating a lottery ticket at a mobile device, comprising: performing the following to a mobile device side: acquiring, by a camera of the mobile device, an image of a lottery ticket having an identification code and a visual security means; sending the identification code to a main server; receiving instructions to manipulate an interactive three-dimensional presentation from the main server; augmenting the interactive three-dimensional presentation in an image sequence imaging the lottery ticket, the image sequence is currently captured by the camera and displayed by the mobile device; receiving input from a user interacting with the interactive three-dimensional presentation using user interface of the mobile device; and manipulating the interactive three-dimensional presentation according to the instructions and in response to processing the input.

18 Claims, 2 Drawing Sheets

(56) References Cited

U.S. PATENT DOCUMENTS

| | | | | |
|---|---|---|---|---|
| 2008/0194323 | A1* | 8/2008 | Merkli .................... | A63F 13/02 463/30 |
| 2012/0122528 | A1* | 5/2012 | Lyons ................ | G07F 17/3241 463/1 |
| 2013/0083066 | A1 | 4/2013 | Aoki et al. | |
| 2014/0100896 | A1 | 4/2014 | Du et al. | |
| 2014/0274318 | A1* | 9/2014 | Bronshteyn ......... | G07F 17/3241 463/25 |
| 2014/0378204 | A1 | 12/2014 | Michel et al. | |

OTHER PUBLICATIONS

Official Action Dated Apr. 27, 2016 From the US Patent and Trademark Office Re. U.S. Appl. No. 14/588,953.

* cited by examiner

3D LOTTERY CARD

RELATED APPLICATION

This application is a Continuation of U.S. patent application Ser. No. 14/588,953 filed on Jan. 4, 2015. The contents of the above application are all incorporated by reference as if fully set forth herein in their entirety.

FIELD AND BACKGROUND OF THE INVENTION

The present invention, in some embodiments thereof, relates to activating a lottery ticket at a mobile device and, more particularly, but not exclusively, to activating a lottery ticket at a mobile device using augmented reality interface.

Many types of lottery tickets and methods of activating them are used by lottery companies. Some of these methods include physical altering of the ticket. Some of the methods use electronic devices, such as personal mobile devices, for scanning the lottery card.

To prevent counterfeit of lottery cards, many different measures exist, including, such as holographic prints and/or complex numbering system.

SUMMARY OF THE INVENTION

According to an aspect of some embodiments of the present invention there is provided a method of activating a lottery ticket at a mobile device, comprising: performing the following to a mobile device side: acquiring, by a camera of the mobile device, an image of a lottery ticket having an identification code and a visual security means; sending the identification code to a main server; receiving instructions to manipulate an interactive three-dimensional presentation from the main server; augmenting the interactive three-dimensional presentation in an image sequence imaging the lottery ticket, the image sequence is currently captured by the camera and displayed by the mobile device; receiving input from a user interacting with the interactive three-dimensional presentation using user interface of the mobile device; and manipulating the interactive three-dimensional presentation according to the instructions and in response to processing the input.

Optionally, the method further comprises, after the acquiring: verifying authenticity of the lottery card according to the visual security means captured in the image; and identifying the identification code captured in the image.

Optionally, the lottery ticket is one of a plurality of lottery tickets associated with a lottery game.

More optionally, the lottery ticket further includes a second identification code for identifying the lottery game.

Optionally, the lottery ticket is an unused scratch ticket.

Optionally, the verifying includes personal information of the user.

Optionally, the verifying is further based on personal information of the user.

Optionally, the sending and the receiving are performed by encrypted communication.

Optionally, the method further comprises: performing the following to a mobile device side: activating an action for marking the lottery ticket as obsolete.

Optionally, the method further comprises: making a decision regarding a winning amount based on the input; and presenting the winning amount to the user.

According to some embodiments of the invention there is provided a computer readable medium comprising computer executable instructions adapted to perform the method.

According to an aspect of some embodiments of the present invention there is provided a method of activating a lottery ticket at a mobile device, comprising: performing the following to a main server side: receiving an image from a mobile device, acquired by a camera of the mobile device, of a lottery ticket having an identification code and a visual security means; verifying authenticity of the lottery card according to the visual security means captured in the image; identifying the identification code captured in the image; selecting instructions to manipulate an interactive three-dimensional presentation that is augmented by the mobile device in an image sequence imaging the lottery ticket captured by the camera; and sending the instructions to the mobile device.

Optionally, the verifying is further based on an indication of the lottery ticket being purchased.

Optionally, the method further comprises: marking the identification code as obsolete in a dataset of lottery ticket identification code in the main server.

Optionally, the method further comprises: performing the following to a main server side: receiving indication of input received from a user interacting with the interactive three-dimensional presentation using user interface of the mobile device; and monitoring the input.

More optionally, the method further comprises: performing the following to a main server side: sending further instructions to manipulate the interactive three-dimensional presentation to the mobile device according to the input.

More optionally, the method further comprises: performing the following to a main server side: making a decision regarding a winning amount based on the input; and sending indication of the decision to the mobile device.

According to some embodiments of the invention there is provided a computer readable medium comprising computer executable instructions adapted to perform the method.

According to an aspect of some embodiments of the present invention there is provided a system for activating a lottery ticket at a mobile device, comprising: a mobile device that: acquires, by a camera of the mobile device, an image of a lottery ticket having an identification code and a visual security means; sends the image to a main server; receives instructions to manipulate an interactive three-dimensional presentation from the main server; augments the interactive three-dimensional presentation in an image sequence imaging the lottery ticket, the image sequence is currently captured by the camera and displayed by the mobile device; receives input from a user interacting with the interactive three-dimensional presentation using user interface of the mobile device; and manipulates the interactive three-dimensional presentation according to the instructions and in response to processing the input; and a main server that: receives the image from the mobile device; verifies authenticity of the lottery card according to the visual security means captured in the image; identifies the identification code captured in the image; selects the instructions; and sends the instructions to the mobile device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
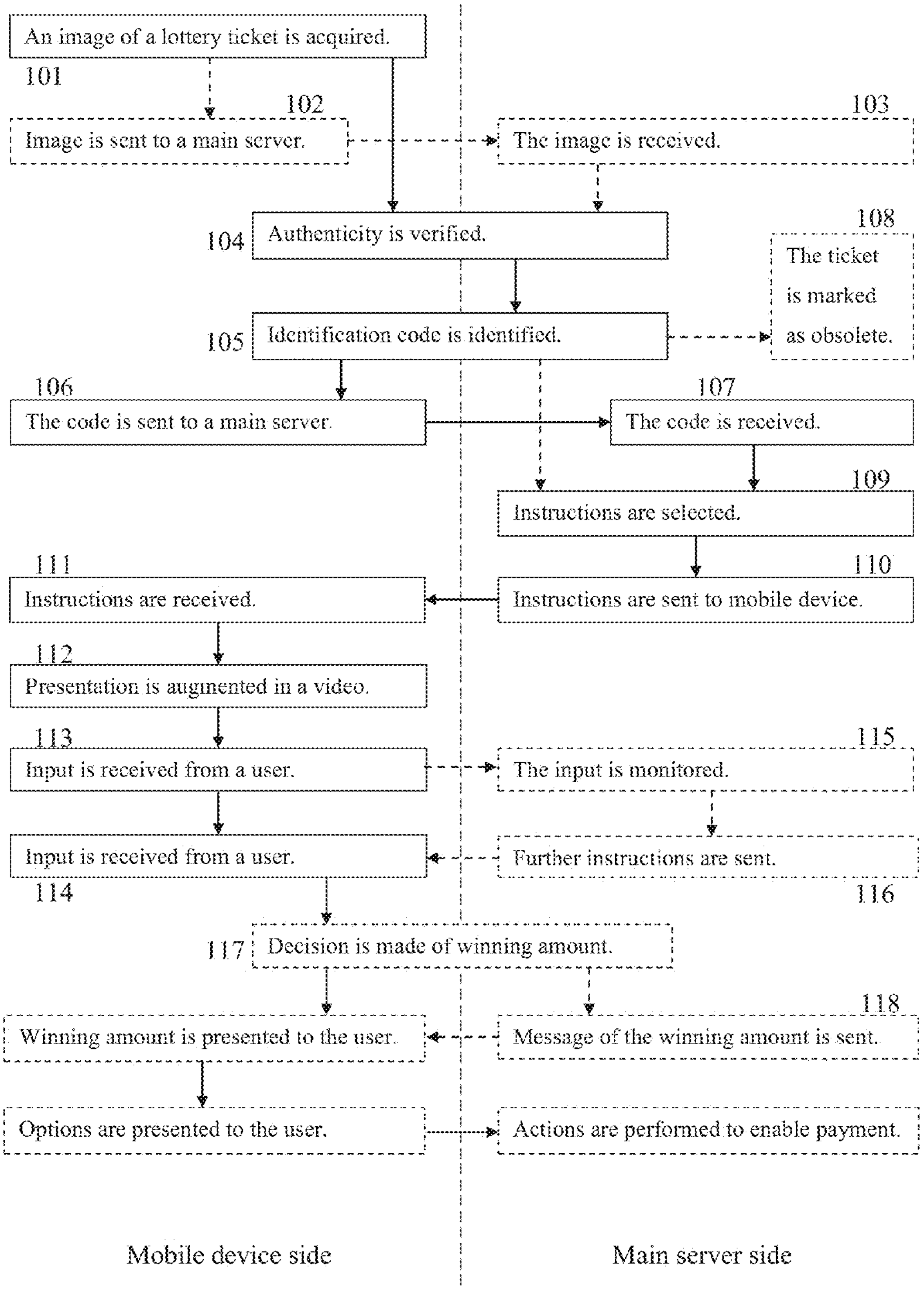
FIG. 1 is a flowchart schematically representing a method for of activating a lottery ticket at a mobile device, according to some embodiments of the present invention.

The present invention, in some embodiments thereof, relates to activating a lottery ticket at a mobile device and, more particularly, but not exclusively, to activating a lottery ticket at a mobile device using augmented reality interface.

According to some embodiments of the present invention, there is provided a method of activating a lottery ticket at a mobile device that includes capturing an image of the ticket, verifying the authenticity of the ticket, presenting an interactive three-dimensional presentation, for example of a lottery game, augmented in an image sequence of the ticket and receiving input from the user through the interactive presentation.

The method allows an interesting and enjoyable experience of playing lottery games. Also, the method provides means of anti-counterfeit measures by executing some of the actions required for winning on a main server.

In an exemplary scenario of using the method, a user playing lottery buys a ticket in the lottery point of sale. The user captures an image of the ticket using the camera of his Smartphone device. On the screen he sees the original ticket, augmented with a three-dimensional presentation, for example of a lottery game. The user may navigate in the three-dimensional virtual world to see the presentation from all it sides and/or for participating in a game, following game instructions. The user may perform predefined actions on the three-dimensional presentation with his Smartphone device, such as searching objects, reveal objects and/or point objects.

After performing a predefined set of actions, changes in the three-dimensional presentation appear. According to those changes the user sees whether he won the prize of the lottery ticket or lost, where different presentations are indicative of different winning status. If the user won he may collect his money at the point of sale or the money may be transferred into his lottery account.

The platform may be used for augmenting a presentation of a social lottery game where the augmented presentation simulate entities which participant in the game in real time and/or friends of the user.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
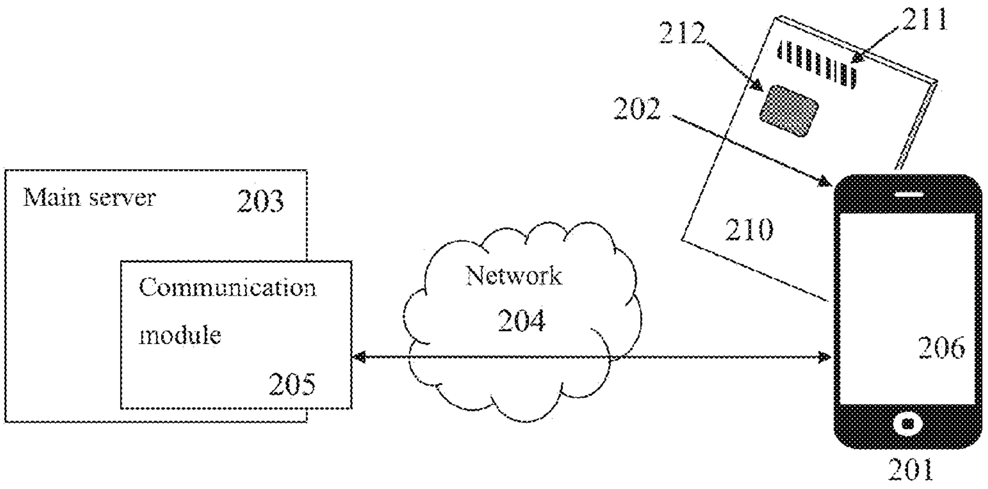
FIG. 2 is a schematic illustration of a device of activating a lottery ticket at a mobile device, according to some embodiments of the present invention.

Referring now to the drawings, FIG. 1 is a flowchart schematically representing a method of activating a lottery ticket by presenting an interactive three-dimensional presentation, for example of a lottery game, at a mobile device to allow a user to participate in a real time game, according to some embodiments of the present invention. Reference is also made to FIG. 2, which is a schematic illustration of a device of activating a lottery ticket at a mobile device, according to some embodiments of the present invention.

Mobile device 201 may be any electronic device having a camera 202, for example, a tablet computer, a laptop computer, a mobile phone, electronic glasses and/or any other device. Camera 202 may be, for example, a front facing camera of mobile device 201, a back facing camera of mobile device 201 and/or an external camera attached to mobile device 201. Mobile device 201 may contain an application that performs the method, and/or may use an online application operated from a network.

First, as shown at 101, an image of a lottery ticket 210 is acquired by camera 202 of mobile device 201. Lottery ticket 210 has an identification code 211 and a visual security means 212.

Lottery ticket 210 may be any kind of ticket or object. For example, an unused scratch ticket, a paper ticket produced by a printing machine, a cardboard ticket, a ticket printed with holographic images, plastic card, metal foil card and/or any other physical card or ticket. Lottery ticket 210 may be purchased by a user, for example at a point of sale, a vending machine, through an internet website, via a mobile application and/or in any other way. Optionally, when lottery ticket 210 is purchased, an indication is sent to a main server 203. Optionally, the indication includes personal information of the user buying lottery ticket 210.

Identification code 211 may be, for example, a number, a combination of numbers and letters, a shape, Bar Code, Quick Response (QR) Code and/or any other unique sign.

Visual security means 212 may be, for example, holographic prints, watermarks, a hidden number, an image that is revealed by the user for example by scratching the card, cutting part of the card, and/or by other means that change appearance of the ticket, and/or any other anti-counterfeit measure.

Optionally, lottery ticket 210 is one of multiple lottery tickets associated with the same lottery game. Optionally, the lottery tickets have the same prints except for their identification codes, for example, having the same image printed on them.

Optionally, lottery ticket 210 includes a second identification code for identifying the lottery game. Optionally, lottery ticket 210 is printed with other information, for example, buying price of the ticket, maximal prize, terms of use, winning chances and/or any other information.

Then, optionally, as shown at 102, the image is sent to main server 203. The image is received by main server 203, as shown at 103. This may be triggered by the user or may be automatically triggered when an image of lottery ticket 210 is captured by camera 202.

Main server 203 may be any kind of computing device, for example, a mainframe computer, an enterprise server, a workstation, multiple connected computers and/or a personal computer. Main server 203 may include a communication module 205 for receiving the captured image and the location. Communication module 205 may be, for example, a hardware element such as a network adapter card and/or a software module such as a computer program.

Mobile device 201 may be connected to main server 203 by a network 204. Network 204 may be, for example, a wireless network such as mobile network, wireless local area network (WLAN) such as Wireless Fidelity (WiFi™) and/or a wireless personal area network (WPAN) such as Bluetooth™ protocol. Optionally, communication between main server 203 and mobile device 201 are encrypted to prevent fraudulent use of the system.

Then, as shown at 104, authenticity of lottery ticket 210 is verified according to visual security means 212. This is done by recognizing visual security means 212 and comparing its parameters to known parameters of authentic lottery card. This may be done by mobile device 201 and/or by main server 203.

Optionally, when visual security means 212 fails to be authenticated, the user is notified that lottery ticket 210 has a problem. The notification may include recommendations for the user, for example, to contact the point of sale where he bought the ticket and/or to check other parameters of the ticket to identify counterfeit.

Optionally, when no indication sent to main server 203 of lottery ticket 210 being purchased, lottery ticket 210 is marked as disabled in a dataset of main server 203 and the user is notified that lottery ticket 210 has a problem.

Then, as shown at 105, identification code 211 that is captured in the image is identified. This may be done by mobile device 201 and/or by main server 203. When identification is done by mobile device 201, identification code 211 is sent to main server 203, as shown at 106, and received by main server 203, as shown at 107.

Optionally, as shown at 108, the ticket is marked as obsolete. This may be done, for example, by changing the status of the identification code in a dataset of main server 203 and/or by activating a change on the ticket surface that will indicate that the ticket was used, for example, electromagnetic waves from mobile device 201 that activate an electronic element in lottery ticket 210 and change the color of an area on the ticket. Optionally, when a predetermined time passed after an indication sent to main server 203 of lottery ticket 210 being purchased, lottery ticket 210 is marked as disabled in a dataset of main server 203.

Then, as shown at 109, instructions to manipulate an interactive three-dimensional presentation are selected by main server 203 according to identification code 211. The interactive three-dimensional presentation may be, for example, a virtual presentation of an image and/or a shape having different parameters for each lottery ticket. The interactive three-dimensional presentation may be selected according to the lottery game associated with lottery ticket 210.

The instructions may include, for example, instructions for how to present the virtual shape over lottery ticket 210 and/or instructions for changes that should be made to the virtual shape and/or image when different actions are made by the user.

User actions may be, for example, tapping on the image and/or shape, scratching the image or shape, connection of two images and/or shapes, drawing a circle around the image and/or shape and/or any other action. Changes may be, for example, changes in colors of the image and/or shape, changes in the shape itself, changes of images presented on the shape, new image, video and/or animation presented to the user, sound is played and/or any other change. The instructions may also include logic of the lottery game associated with lottery ticket 210. For example, an effect is shown on the screen, then another effect is shown, then a message is presented.

The instructions are then sent from main server 203 to mobile device 201, as shown at 110, and received as shown at 111.

Then, as shown at 112, the interactive three-dimensional presentation is augmented in an image sequence imaging lottery ticket 210. The image sequence is currently captured by camera 202 and displayed by mobile device 201 on a screen 206 of mobile device 201. The interactive three-dimensional presentation is presented so as to fit the orientation of camera 202 relative to lottery ticket 210. For example, when the user rotates lottery ticket 210, the interactive three-dimensional presentation is also rotated.

Figure 3:
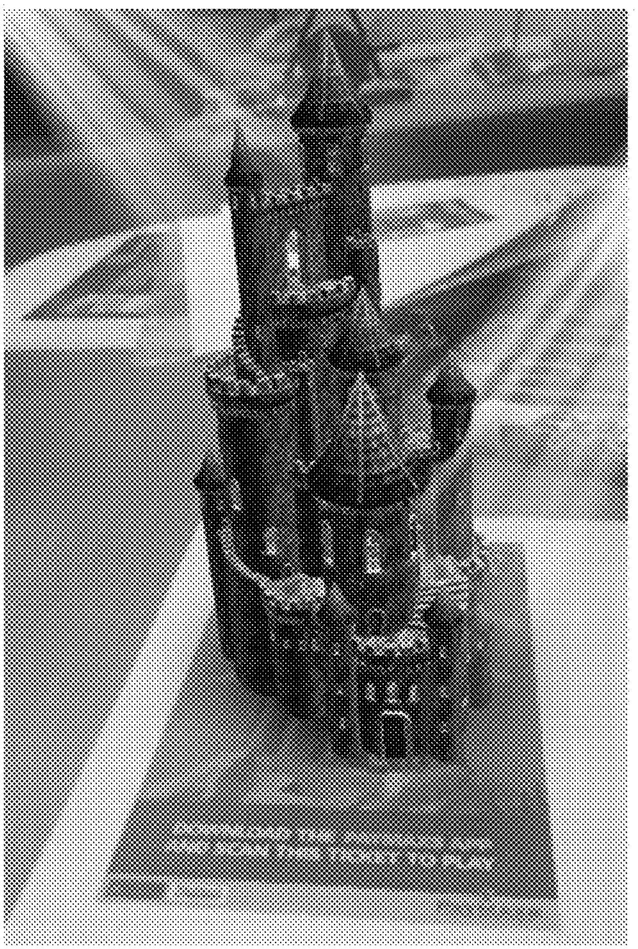
FIG. 3 is an exemplary three-dimensional presentation, according to some embodiments of the present invention.

Reference is also made to FIG. 3, which is an exemplary three-dimensional presentation, according to some embodiments of the present invention. The three-dimensional presentation of a castle is augmented on an image of a ticket.

Then, as shown at 113, input is received from a user interacting with the interactive three-dimensional presentation, by using user interface of mobile device 201. For example, the user may touch different parts of screen 206 that present different parts of the interactive three-dimensional presentation, the user may press buttons on the screen or use touch gestures to enlarge, reduce and/or move the interactive three-dimensional presentation on screen 206.

Then, as shown at 114, the interactive three-dimensional presentation is manipulated according to the instructions received from main server 203 and in response to processing the input received from the user.

Optionally, as shown at 115, the user input is sent by mobile device 201 to main server 203 and is monitored by main server 203. Optionally, as shown at 116, main server 203 may send information and/or further instructions to manipulate an interactive three-dimensional presentation according to the user input. Main server 203 may store the user input for future use, such as statistics.

Then, optionally, as shown at 117, a decision is made regarding the winning amount, based on the input received from the user. For example, the decision may be based on whether the user completed a set of predetermined actions on the interactive three-dimensional presentation. The decision may be, for example, that the user did not win any money, that the user won a specific amount of money, that the user may win an amount of money under certain conditions and/or any other decision. This may be done by mobile device 201 and/or by main server 203. When the decision is made by main server 203, a message of the winning amount is sent to mobile device 201, as shown at 118.

Then, optionally, as shown at 119, the winning amount is presented to the user by mobile device 201 on screen 206. This may be done, for example, by presenting a text message, an image, playing sounds and/or any other notification.

Then, optionally, as shown at 120, when the user won an amount of money, he is presented with options to collect his win. For example, he may choose to collect the win at a point of sale or may choose that the money be transferred into his lottery account or to any other account.

Then, optionally, as shown at 121, an indication of the user's selection is sent to main server 203 and actions are performed by main server 203 to enable the payment. When the user selects that the money be transferred into an account, main server 203 transfers the money. When the user selects collect the win at a point of sale, main server 203 may generate a code, such as a barcode or a QR code to be presented at the point of sale in order to prove the win.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for activating a lottery ticket will be developed and the scope of the term activating a lottery ticket is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of activating a lottery ticket at a mobile device, comprising:

performing the following to a mobile device side:

acquiring, by a camera of said mobile device, an image of said lottery ticket having an identification code and a visual security means;

verifying authenticity of said lottery ticket according to said visual security means captured in said image;

identifying said identification code captured in said image;

sending said identification code and said visual security means to a main server;

wherein said main server further receives an indication when said lottery ticket is purchased by a user, said indication including personal information of said user buying said lottery ticket, wherein said personal information of said user is independent of said mobile device, wherein said personal information of said user is specific to each user of a plurality of users, wherein each user of said plurality of users is associated with different personal information:

receiving instructions to manipulate an interactive three-dimensional presentation from said main server, wherein said instructions are selected at least according to said personal information of said user by said main server, wherein different interactive three-dimensional presentations having different parameters are available for presentation for each lottery ticket at least according to said personal information of said user, wherein a winning outcome of said lottery ticket is predefined for said lottery ticket independently of said different interactive three-dimensional presentations;

augmenting said interactive three-dimensional presentation in an image sequence imaging said lottery ticket, said image sequence is currently captured by said camera and displayed by said mobile device;

receiving input from a user interacting with said interactive three-dimensional presentation using a user interface of said mobile device; and manipulating said interactive three-dimensional presentation according to said instructions and in response to processing said input;

wherein said at least one of said verifying and said identifying are performed by at least one of said mobile device and said server;

wherein at least one of said sending said identification code and said receiving instructions are performed upon successful verification of said authenticity.

2. The method of claim 1, wherein said lottery ticket is one of a plurality of lottery tickets associated with a lottery game.

3. The method of claim 2, wherein said lottery ticket further includes a second identification code for identifying said lottery game.

4. The method of claim 1, wherein said lottery ticket is an unused scratch ticket.

5. The method of claim 1, wherein said verifying includes personal information of said user.

6. The method of claim 1, wherein said verifying is further based on personal information of said user.

7. The method of claim 1, wherein said sending and said receiving is performed by encrypted communication.

8. The method of claim 1, further comprising:

performing the following to a mobile device side:

activating an action for marking said lottery ticket as obsolete.

9. The method of claim 1, further comprising:

making a decision regarding a winning amount based on said input; and presenting said winning amount to said user.

10. A computer readable medium comprising computer executable instructions adapted to perform the method of claim 1.

11. A method of activating a lottery ticket at a mobile device, comprising:

performing the following to a main server side:

receiving an image from a mobile device, acquired by a camera of said mobile device, of said lottery ticket having an identification code and a visual security means;

verifying authenticity of said lottery card according to said visual security means captured in said image;

identifying said identification code captured in said image;

receiving an indication when said lottery ticket is purchased by a user, said indication including personal information of said user buying said lottery ticket, wherein said personal information of said user is independent of said mobile device, wherein said personal information of said user is specific to each user of a plurality of users, wherein each user of said plurality of users is associated with different personal information;

selecting instructions to manipulate an interactive three-dimensional presentation that is augmented by said mobile device in an image sequence imaging said lottery ticket captured by said camera, wherein said instructions are selected at least according to said personal information of said user, wherein different interactive three-dimensional presentations having different parameters are available for presentation for each lottery ticket at least according to said personal information of said user, wherein a winning outcome of said lottery ticket is predefined for said lottery ticket independently of said different interactive three-dimensional presentations; and sending said instructions to said mobile device;

wherein said sending said identification code is performed upon successful verification of said authenticity.

12. The method of claim 11, wherein said verifying is further based on an indication of said lottery ticket being purchased.

13. The method of claim 11, further comprising:

marking said identification code as obsolete in a dataset of lottery ticket identification codes in said main server.

14. The method of claim 11, further comprising:

performing the following to a main server side:

receiving indication of input received from a user interacting with said interactive three-dimensional presentation using user interface of said mobile device; and monitoring said input.

15. The method of claim 14, further comprising:

performing the following to a main server side:

sending further instructions to manipulate said interactive three-dimensional presentation to said mobile device according to said input.

16. The method of claim 14, further comprising:

performing the following to a main server side:

making a decision regarding a winning amount based on said input; and sending indication of said decision to said mobile device.

17. A computer readable medium comprising computer executable instructions adapted to perform the method of claim 11.

18. A system for activating a lottery ticket at a mobile device, comprising:

a mobile device that:

acquires, by a camera of said mobile device, an image of said lottery ticket having an identification code and a visual security means;

sends said identification code and said visual security means to a main server;

wherein said main server further receives an indication when said lottery ticket is purchased by a user, said indication including personal information of said user buying said lottery ticket, wherein said personal information of said user is independent, of said mobile device, wherein said personal information of said user is specific to each user of plurality of users, wherein each user of said plurality of users is associated with different personal information;

receives instructions to manipulate an interactive three-dimensional presentation from said main server, wherein said instructions are selected at least according to said personal information of said user by said main server, wherein different interactive three-dimensional presentations having different parameters are available for presentation for each lottery ticket at least according to said personal information of said user, wherein a winning outcome of said lottery ticket is predefined for said lottery ticket independently of said different interactive three-dimensional presentations;

augments said interactive three-dimensional presentation in an image sequence imaging said lottery ticket, said image sequence is currently captured by said camera and displayed by said mobile device;

receives input from a user interacting with said interactive three-dimensional presentation using user interface of said mobile device; and manipulates said interactive three-dimensional presentation according to said instructions and in response to processing said input; and a main server that:

receives said identification code and said visual security means from said mobile device;

verifies authenticity of said lottery card according to said visual security means captured in said image;

identifies said identification code captured in said image;

selects said instructions; and sends said instructions to said mobile device;

wherein said sending said identification code is performed upon successful verification of said authenticity.

* * * * *